Sept. 22, 1936.  J. BERTIROTTI  2,055,167
FILTER
Filed Aug. 11, 1934  2 Sheets-Sheet 1
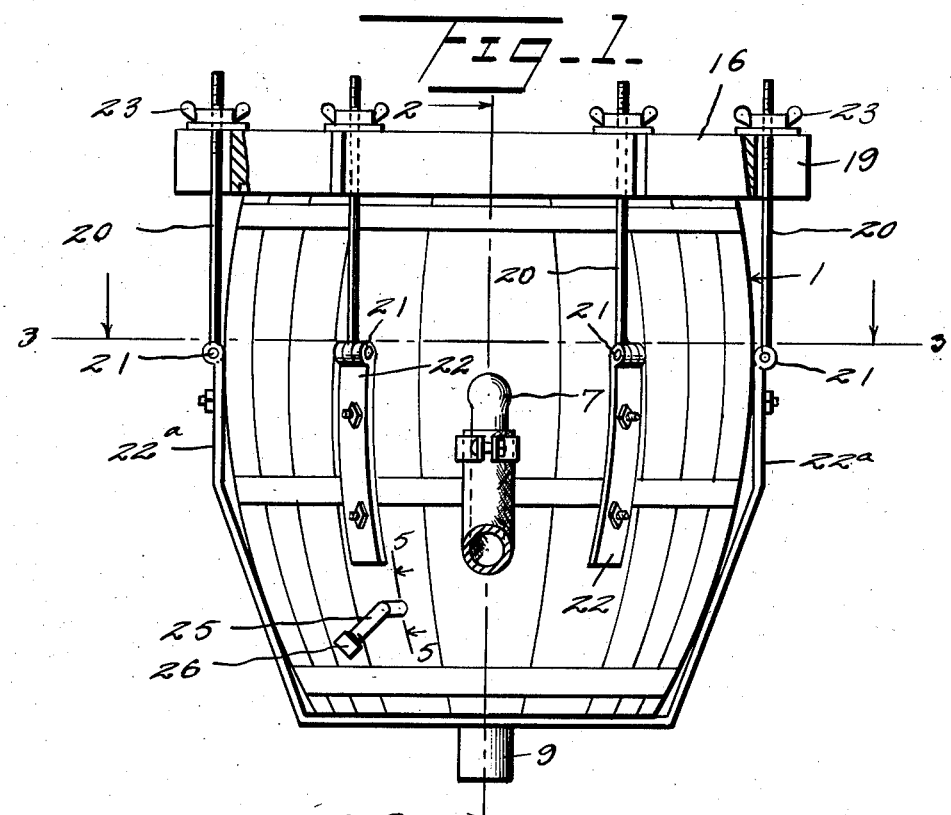
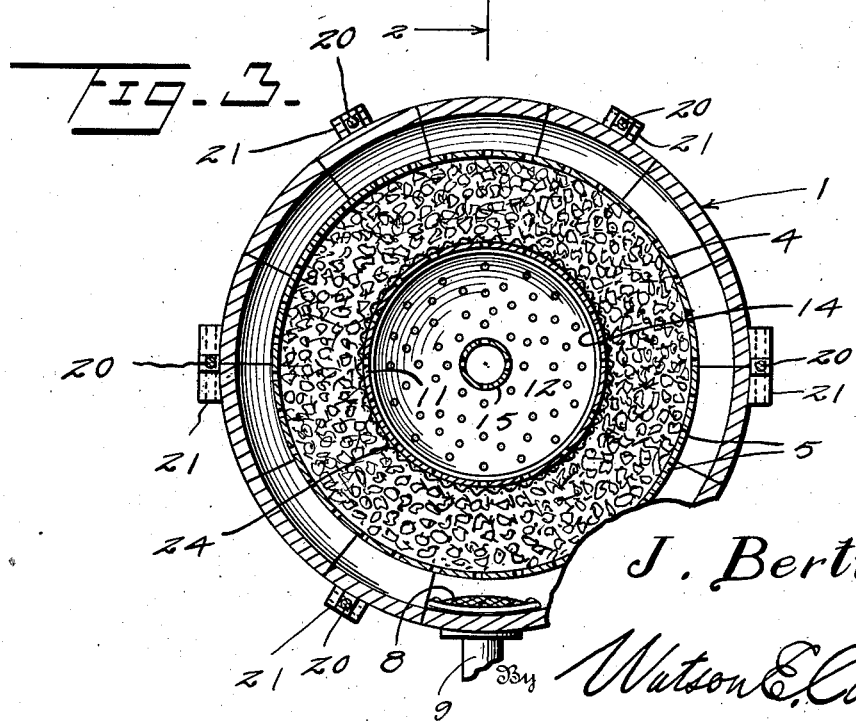
Inventor
J. Bertirotti
By Watson E. Coleman
Attorney Sept. 22, 1936. J. BERTIROTTI 2,055,167
FILTER
Filed Aug. 11, 1934 2 Sheets-Sheet 2
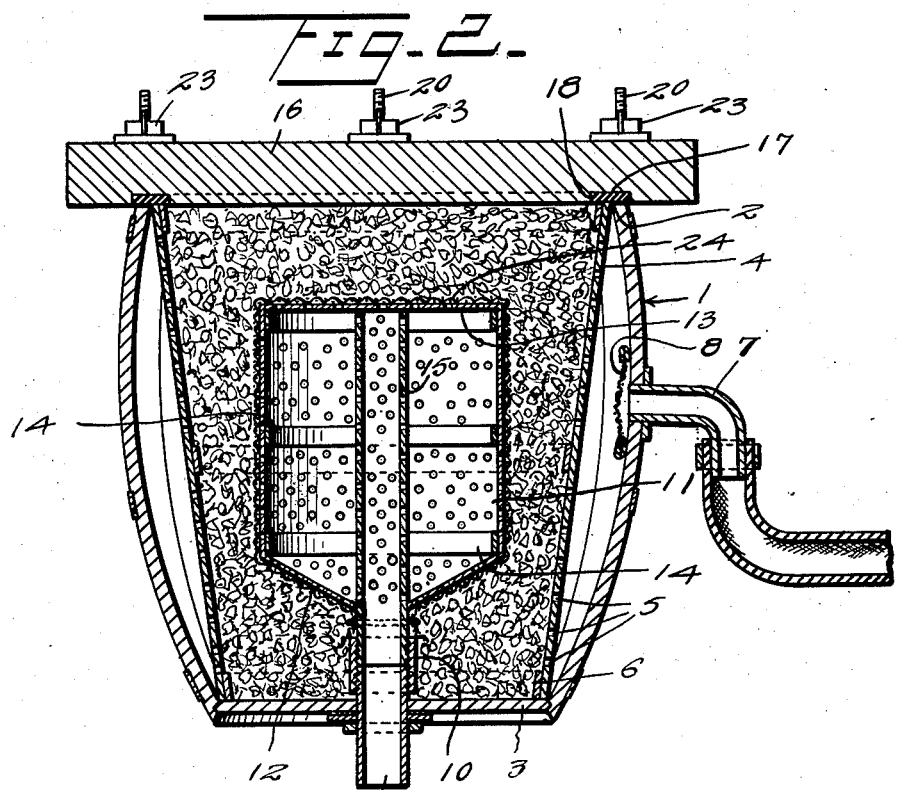
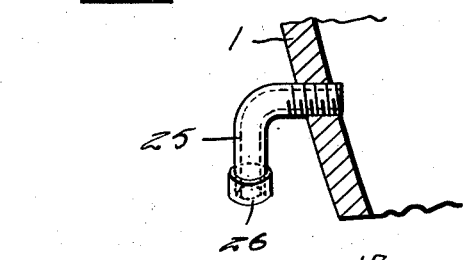
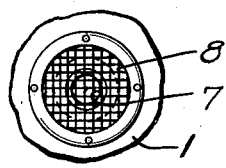
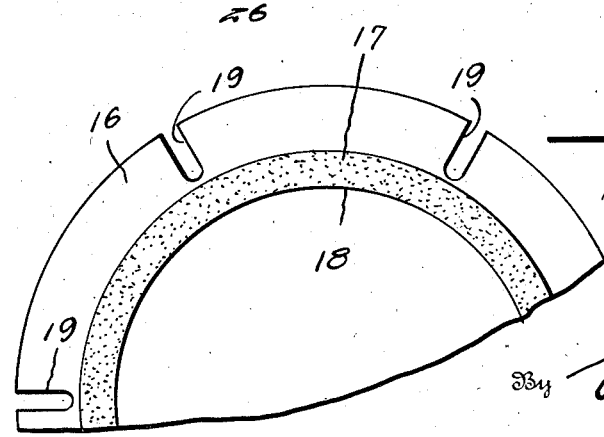
Inventor
J. Bertirotti
By Watson E. Coleman
Attorney Patented Sept. 22, 1936

2,055,167

UNITED STATES PATENT OFFICE 2,055,167

FILTER

Joseph Bertirotti, New Orleans, La.

Application August 11, 1934, Serial No. 739,461

2 Claims. (Cl. 210—131)

This invention relates to improvements in filtering devices and pertains particularly to a device for filtering liquids.

The primary object of the present invention is to provide an improved liquid filter which, while intended for any use to which it may be applicable, is primarily designed for the filtering of wine so that the latter, after being passed through the filter, will be free of all sediment and in a clear and sparkling condition.

Another object of the invention is to provide a filter having a novel arrangement of parts whereby the filter may be readily taken apart for cleaning when such procedure is necessary.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the filter embodying the present invention, portions being in section.

Figure 2 is a vertical sectional view taken on the line 2—2 of Figure 1.

Figure 3 is a horizontal section taken on the line 3—3 of Figure 1.

Figure 4 is a detailed view of a strainer of a filter.

Figure 5 is a sectional view taken on the line 5—5 of Figure 1.

Figure 6 is a view of a portion of the under side of the filter top.

Referring to the drawings wherein like numerals of reference designate corresponding parts throughout the views, the numeral 1 indicates the outside body or shell of the present filtering device which is preferably in the form of the lower half of a barrel so that the wall is bowed outwardly and the top opening 2 is of greater diameter than the interior of the bottom 3. Disposed within the body 1 is a tapered cylindrical strainer unit 4, which is preferably of metal and which is perforated throughout, as indicated at 5. This strainer 4 is reinforced at its top and bottom and also intermediate its ends, by the reinforcing metallic bands 6, and as is illustrated, the narrower lower end of the strainer 4 rests upon the bottom 3 of the body 1 and is of substantially the same overall diameter as the bottom at the inside of the body while the upper end of the strainer is of an overall diameter to snugly fit in the top opening or mouth of the body.

It will also be apparent that since the wall of the strainer 4 is straight throughout, a relatively wide area remains between the same and the wall of the body 1, and into this area, the liquid to be filtered is discharged through the pipe connection 7 which is arranged in its outer end for the convenient connection of a hose therewith while the inner end, which opens through the wall of the body 1 is covered upon the interior of the body by the relatively wide strainer 8. The strainer 8 is of a diameter materially greater than the inlet end of the pipe nipple 7 so that the least amount of resistance to the entrance of the liquid is offered.

The bottom 3 of the body 1 has an opening through which a section of pipe 9 extends, which pipe section constitutes the outlet for the filter. The inner end of the pipe section 9 projects a substantial distance above the bottom 3 and is screw threaded to receive the coupling 10. Disposed centrally within the strainer 4 is a cylinder 11 which has the downwardly extending conical bottom wall 12, and the flat top wall 13. These walls, as well as the side wall of the cylinder, are perforated throughout and the interior of the cylinder is provided with suitable reinforcing bands 14 to prevent its collapse under the pressure which is applied thereto.

Extending centrally through the cylinder 11 is a perforated tube 15, which has its upper end in contact with the upper end wall 13 of the cylinder, while its lower end passes through the center of the lower wall of the cylinder and is threaded for engagement by the coupling collar 10 by which it is held in alinement with the pipe section 9. This perforated tube 15 has its perforations lying only within the confines of the cylinder 11, that portion of the tube 15 which extends beyond the bottom wall 12 of the cylinder being unperforated.

The upper end of the body 1 is closed by the relatively heavy head 16 which is provided in one face with the annular channel 17 in which a rubber gasket 18 is secured. This channel receives the top edge of the body 1 and the top edge of the strainer cylinder 4.

The edge of the head 16 is provided with a plurality of slots 19, preferably ten in number, although any number may be employed, and each of these slots receives a bolt 20 which is hingedly connected at its lower end, as at 21, with a strap 22 which is bolted to the wall of the body 1. Two of these straps are formed integral with one another and connected across the bottom of the body 1, as indicated at 22a, thus providing a reinforcing means for the bottom of the filter, and a suitable aperture is made in the reinforcing band for the extension of the outlet pipe 9 therethrough. The upper ends of the bolts 20 are screw threaded to receive the winged nuts 23 which bear against suitable washers placed upon the top of the head 16 so as to clamp the head firmly in position. It will thus be seen that when the head is in place, it will bear against the upper end of the straining cylinder 4 and secure the latter firmly in position.

The inner straining cylinder 11 is encased in one or more fabric bags of suitable material, as indicated by the numeral 24, the mouths of these bags being drawn in and tied beneath the cylinder 11 about the lower imperforate end of the tube 15.

When the filter is to be used, the straining cylinder 4 is packed with a suitable filter material such as filter paper so that the inner cylinder 11 and the encasing bag or bags 24 therefor will be entirely encased in this filtering material. After the filtering material has been placed in the straining cylinder 4, the head 16 is replaced and the liquid to be strained or filtered is forced by any suitable means through the inlet strainer 8 and caused to pass through the filtering material, the bag 24, and into the cylinder 11 to pass out through the tube 15 and the outlet pipe 9.

For the purpose of flushing the filtering material, and also to let any fluid drained off, when the filtering material is being packed, into the cylinder 4, as the material is preferably packed in while in dampened position, an outlet pipe 25 is connected through the wall of the body 1 in the lower part of the latter and this is normally closed by the removable cap 26 which is, of course, removed while the packing of the filter material is taking place and also while the filter is being flushed.

What is claimed is:—

1. A filter, comprising a barrel body having a wall curved to form a continuous outward bow from top to bottom and having an open top of slightly greater diameter than the bottom, a tapered receptacle adapted to position in the body upon the bottom thereof, the overall diameter of the smaller end of said receptacle being substantially the same as the interior diameter of said body at the bottom and the overall diameter of the top of the receptacle being substantially the same as the interior diameter of said top and the top edge of the receptacle being flush with the top edge of the body, a cover disposed upon the top of said body and engaging the same and the receptacle to maintain the latter in position, means for drawing said cover tightly against said body and receptacle, a filtering material within the receptacle, the receptacle being of a perforate character, fluid inlet means opening through the wall of the body, an outlet tube secured to the bottom of the body and extending into the filtering material of the receptacle, a perforate receptacle mounted upon said outlet tube and in communication with the same, and a substantially bag like strainer enclosing said last perforate receptacle having a mouth drawn in around the outlet tube.

2. In a filter structure, a body of barrel-like form having a bottom and an open top of a diameter greater than the bottom, a straight walled cylindrical receptacle having top and bottom diameters substantially the same as the top and bottom inside diameters of said body and of the same inside height as the body and positioned therein, said wall being perforated, a straining outlet means for the body, a top for the body carrying sealing means engaging the top edges of the body and of the receptacle, fluid inlet means for the body adjacent the transverse center of the same, a plurality of straps secured vertically to the outside of the body and each terminating at its top end in a hinged portion, two opposite ones of the straps being joined by a reinforcing strap passing beneath the body, and securing elements adapted for detachable connection with said top and each hingedly coupled with one of said strap hinge sections.

JOSEPH BERTIROTTI.